Jan. 11, 1927.
A. MILLER
STORAGE BATTERY
Filed July 25, 1924
1,613,617
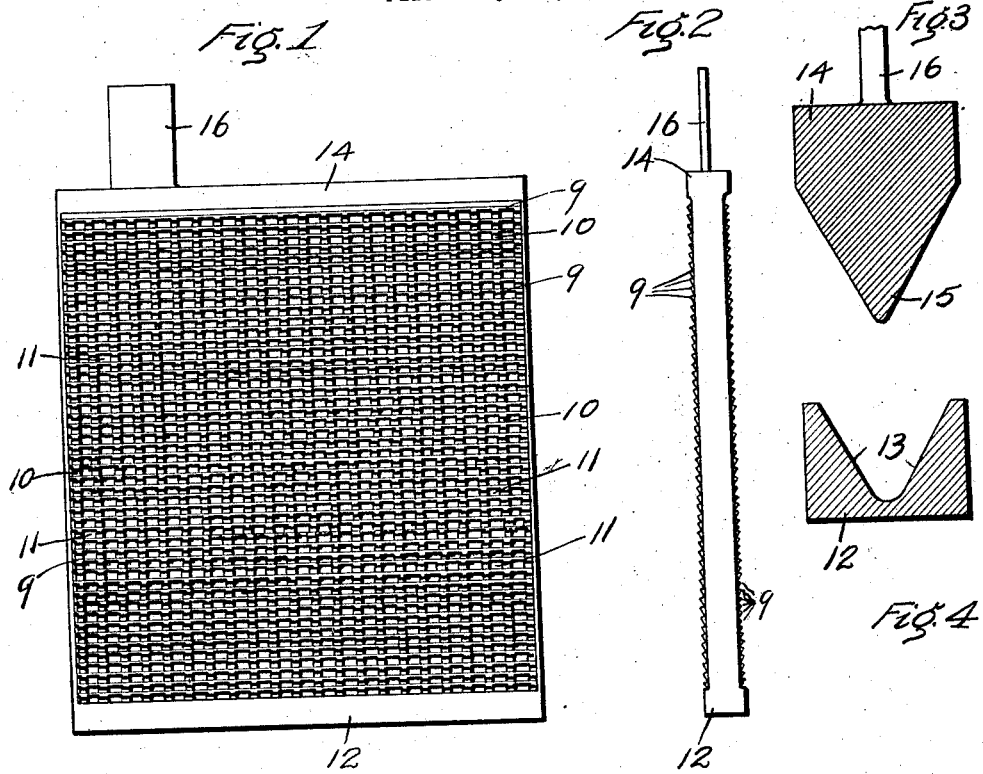
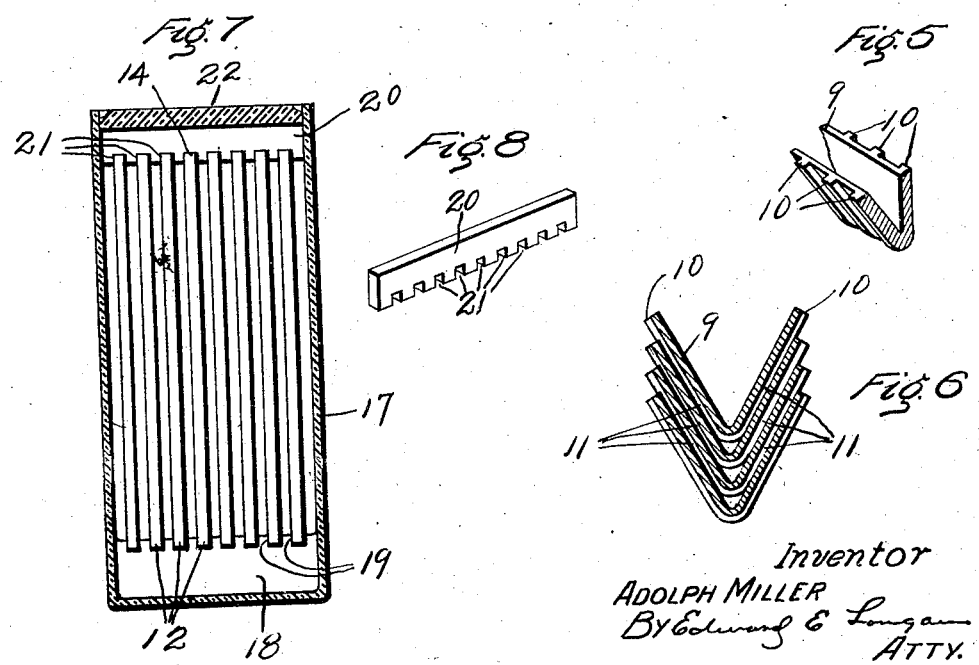
Inventor
ADOLPH MILLER
By Edward E. Longan
ATTY.

Patented Jan. 11, 1927.

1,613,617

UNITED STATES PATENT OFFICE.

ADOLPH MILLER, OF KIRKWOOD, MISSOURI.

STORAGE BATTERY.

Application filed July 25, 1924. Serial No. 728,077.

My invention relates to improvements in storage batteries and has for its primary object a storage battery which occupies a very small space, has a very high efficiency and which can be charged in a very rapid rate without in any way causing damage to the battery.

A further object is to construct a storage battery in which separators between plates are unnecessary thereby cutting down the internal resistance of batteries and consequently the tendency to heat.

A still further object is to construct a storage battery in which the plates have more than three times the amount of surface exposed to the action of the electrolyte than the present commercial batteries.

A still further object is to construct a storage battery in which the paste that is at present used in storage battery plates is entirely eliminated. This together with the elimination of the separators prevents any deposits of foreign matter in the bottom of the cell.

A still further object is to construct a storage battery in which the plates are so constructed as to be practically proof against buckling.

In the drawings:

Fig. 1 is a face view of one of my plates assembled;

Fig. 2 is an edge view of the same;

Fig. 3 is an enlarged fragmental cross section with the top or the bus bar of the plate;

Fig. 4 is an enlarged cross section with the bottom bar of the plate;

Fig. 5 is a fragmental perspective section of one of the cross bars employed;

Fig. 6 is an enlarged cross section showing a number of cross bars in assembled position showing the passage between the bars;

Fig. 7 is a vertical cross section of a battery cell showing the plates in position and the manner of spacing the same; and Fig. 8 is a perspective view of one of the spacers employed for the top edge of the plates.

In carrying out my invention, I employ a plurality of bars 9, these bars are preferably V shaped in cross section and provided on their outer surfaces with a plurality of spaced apart ribs 10. The purpose of these ribs is to form circulating spaces 11 between the cross bars (see Fig. 6) when the bars are nested or assembled. The cross bars 9 are made of a metal which is composed of about 90 per cent pure lead and about 10 per cent redistilled mercury. This metal when formed is very flexible and the examination of a broken edge under a fifty power microscope shows the structure fibrous and somewhat porous in nature, with the fibers interlaced or seeming to over-lap one another. This fibrous structure of metal does not impair its tensile strength or toughness and it can be easily worked and rolled out in thin strips, thus making it relatively cheap to form the bars.

The lowest cross bar of the plate is placed in a bar 12 which is provided with a longitudinally extending groove 13. This groove is of the same shape as the bars 9. In the uppermost bar is placed a bus-bar 14 which is provided with an extension 15, this extension being of the same shape as the inside surface of the bar. The bar 14 is provided with the usual terminal post 16 which is designed to be secured in the crows-foot of the ordinary battery binding post.

The manner of assembling the plate is preferably as follows—The bar 12 is placed in any suitable frame and then the desired number of bars 9 are added one upon the other, as illustrated in Fig. 6, until the desired height of the plates has been reached, after which the bar 14 is placed in position in the uppermost bar. The end of the bars 9 and of the bars 12 and 14 all terminate in the same vertical plane, and a heated tool is run along the vertical edges of the plates melting them and securing the plates together in assembled form.

After the plates have been thus made, they are treated to prepare them for use in the battery in the following manner—

I take a jar of sufficient size to treat from twelve to fifteen plates at a time, into this jar is placed a mixture of sulphuric acid and distilled water of 1100 specific gravity. Into this solution are placed positive plates together with a plurality of plain lead plates which will hereafter be called dummy plates. The battery plates are all connected to the positive pole of a source of electrical energy and the dummy plates to the negative pole, an electric current of four volts and from 200 to 250 amperes is passed through these plates for about sixteen hours, during which time the temperature of the solution rises up to about 130 degrees F. Should the temperature rise above this point the amperage is reduced so as to lower the temperature.

During this treatment the mercury appears to pass longitudinally through the bars and accumulate on the vertical edges of the plate in very minute globules which gradually run down the vertical edges of the plate and drop to the bottom of the jar. This action causes the bars 9 to become extremely porous, the plate is lightened and the bars become very flexible, but without impairing the tensile strength or toughness.

The negative plates are placed in a separate jar in a like solution and treated in the same manner, but in this instance, the plates are secured to the negative pole of the source of electrical energy, while the dummy plates are attached to the positive poles.

After this treatment the positive plates are placed in a jar containing a sulphuric acid solution of 1100 specific gravity to which is added about one pound lead peroxide and about one ounce lead sulphate to each gallon of solution or the salts may be mixed with additional acid solution to about the consistency of thick paint and added to the original acid solution. This solution of acid and salts is kept constantly agitated by means of forcing air therethrough or any form of mechanical agitation so as to prevent the salts from settling. Dummy plates are also employed in this jar, the positive plates being attached to the positive pole of the source of electrical energy and the dummy plates to the negative pole. A direct current of from two to four volts and twelve to sixteen amperes is now applied to the plates continuously for forty-eight hours, during which time hydrometer and thermometer tests are made at frequent intervals so that the solution may be maintained at approximately 1100 specific gravity and the temperature of the solution, during the treatment so regulated by varying the amperage of the current, will not exceed 100 degrees F. The positive plates thus treated have a reddish brown color which at first is only on the surface of the metal but gradually penetrates deeper and deeper as the battery is used so that it eventually permeates the entire bar, thus increasing the efficiency of the plate by use.

The negative plates, after their first treatment, are assembled in a separate jar together with dummy plates. In this jar is placed a solution of 1100 specific gravity sulphuric acid and water together with about one pound litharge, one and one-half ounces of lead peroxide and about three-fourths of an ounce of lead sulphate to each gallon of liquid. This mixture is agitated in the same manner as the liquid for treating the positive plates, a direct electric current having the same voltage and amperage as used for the positive plates is also used, but in this instance, the negative pole is attached to the plates and the positive pole to the dummies. The balance of the treatment is precisely the same as for the negative plates, the temperature and gravity being maintained in the same manner.

In this treatment the negative plates other than becoming somewhat dull, do not change color from their original appearance, but this dullness also gradually penetrates the entire bar during use, in the same manner as the color penetrates the positive plates.

The plates after being thus treated are washed in a sulphuric acid solution of about 1100 specific gravity so as to remove any salts which may have lodged in the plate or rather in the individual bars. The plates are then dried so that they can be handled without the acid effecting the hands and secured to their respective terminals.

After this has been done, the units of positive and negative electrodes are placed in the jar indicated by the numeral 17. This jar is provided with the usual support 18 at its bottom, this support however, is provided with notches 19 to receive the lower edges of the plates and hold them against side movement, which might cause contact and short circuit of the battery. The upper plates are separated by two or more bars 20 which are provided with notches 21 into which the upper edges of the plates pass. The top 22 is now put on the cell or jar 17, and sealed and the ordinary commerical electrolyte added to the cell. The cell is now ready to receive its final charge which is done by charging it at approximately double the rate of the capacity of the cell. For example, if the battery is a six volt battery 90 ampere hour cell, it can be charged with a six volt 180 ampere current in one-half hour without in any way affecting the efficiency of the battery, there being practically no heating and no buckling of the plate.

In discharging the battery a great sudden strain can be placed thereon because due to the peculiar shape of the bars a very rigid construction is obtained, and one in which it is practically impossible to cause any buckling.

I have also found that in my construction of plate the expansion, due to heavy charging or heavy discharging, is practically nothing and I account for this feature through the fact that the battery does not heat up either during the charging or discharging. This feature is again in turn explained by the fact that the internal resistance of the battery is practically nothing.

My battery is especially valuable for electric commercial vehicles as it is possible to charge a battery in a very short time thus permitting the vehicle to be used practically continuously and not necessitating the use of two batteries for continual service, or laying up the vehicle for long periods of time for charging, as is the case at present with the commercial batteries now in use.

The bars 12 and 14 may be formed either of the same metal as the bars 9 or if desired, the ordinary metal now used in the construction of battery plates, may be employed. This feature is immaterial and does not affect the operation of my battery in the least except that the metal out of which the bars are formed does not corrode as quickly as the ordinary battery metal.

It will be noted that the bars 9 all diverge upwardly and outwardly so that there will be no chance for air or gas bubbles to lodge underneath one of the bars and prevent the electrolyte from contacting with the bar, which would most probably be the case were the bars inverted.

Furthermore I have found that the electrolytic action of the current on the plates cause the electrolyte to circulate and carry out any impurities which might lodge on the inner surface of the bars during any time that the battery is not in use, thus I am always assured of clean bars and a thorough contact of the electrolyte with the bars throughout their entire surface, except where the ribs of one bar contact with the inner surface of the other bar.

The metal out of which the bars are made is composed of mercury and lead, approximately 10% of mercury and 90% of lead. These two metals are placed in separate containers and heated to the boiling point of mercury. The lead is then agitated and the mercury added thereto. During this time the lead is maintained at the boiling point of mercury. After the mercury has all been added, the temperature of the metal is still maintained as is the agitation for a predetermined length of time so that the two metals will be thoroughly mixed. The metal is then cast and made into bars. The method of making this metal is more fully described in my application for metallic composition and the method of making the same, Serial No. 726,940, filed July 19th, 1924.

Having fully described my invention, what I claim is:—

1. In a storage battery, a plate comprising a series of substantially V shaped bars nested together and being provided with spaced apart laterally extending ribs for holding the same slightly spaced apart throughout their length, whereby an electrolyte may be passed freely therethrough, and means for uniting the ends of said bars.

2. In a storage battery, a plate comprising a series of substantially V shaped bars nested together and being provided with spaced apart laterally extending ribs for holding the same slightly spaced apart, the spaces between adjacent ribs being greater than the width of said ribs, whereby an increased plate area is exposed for electrolytic action, and means for uniting the ends of said bars.

3. In a storage battery a plate comprising a series of substantially V shaped bars nested together, each bar being provided with integrally formed spaced apart transverse ribs on their exterior face whereby said bars are held in spaced apart position, and an electrolyte passes freely therethrough, the ends of said bars being united by burning.

4. In a storage battery, a plurality of electrodes each composed of nested V shaped bars united along their ends, said bars being supported in spaced relation to each other throughout the major portion of their length by laterally extending ribs formed on one face only, whereby a free circulation of electrolyte through said plate is permitted.

5. In a storage battery, an electrode comprising a bar provided with a V shaped depression in one edge, a plurality of V shaped bars supported thereby, a bar provided with a terminal resting on the uppermost V shaped bar, all of said bars being united along their ends by burning, the V shaped bars between the uppermost and lower bars being held in spaced relation to each other by lateral ribs formed on one face only, whereby an increased plate area is exposed to the action of an electrolyte.

6. A storage battery comprising a cell, a plurality of positive and negative plates located therein, laterally extending means engaging one of the faces of said plates for holding the same in spaced apart position, and an electrolyte in said cell, said electrolyte entirely surrounding said plates and passing freely therethrough, whereby an increased surface for electrolytic action is obtained.

7. A storage battery plate comprising a plurality of bars having lateral projections formed on one face thereof, said projections adapted to contact with the opposite face of an adjacent bar for holding said bars in spaced relation to each other, and the ends of said bars being united by burning.

In testimony whereof, I have signed my name to this specification.

ADOLPH MILLER.